(12) United States Patent
Lee (10) Patent No.: US 8,878,401 B2
(45) Date of Patent: Nov. 4, 2014

(54) LINEAR VIBRATOR HAVING A TREMBLER WITH A MAGNET AND A WEIGHT

(75) Inventor: Kapjin Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 78 days.

(21) Appl. No.: 13/242,270

(22) Filed: Sep. 23, 2011

(65) Prior Publication Data

US 2012/0112565 A1    May 10, 2012

(30) Foreign Application Priority Data

Nov. 10, 2010  (KR) .................. 10-2010-0111729
Nov. 10, 2010  (KR) .................. 10-2010-0111730

(51) Int. Cl.
*H02K 33/00*  (2006.01)
*B06B 1/04*  (2006.01)
*H02K 33/16*  (2006.01)

(52) U.S. Cl.
CPC .............. *H02K 33/16* (2013.01); *B06B 1/045* (2013.01)
USPC .............................................. 310/15; 310/21

(58) Field of Classification Search
CPC ............................... H02K 33/00; H02K 35/00
USPC .............................. 310/15, 17, 20, 21, 29, 36
See application file for complete search history.

(56) References Cited

U.S. PATENT DOCUMENTS

| | | | |
|---|---|---|---|
| 5,406,152 A * | 4/1995 | Fechner et al. ................. | 310/15 |
| 7,355,305 B2 * | 4/2008 | Nakamura et al. ......... | 310/12.03 |
| 7,671,493 B2 * | 3/2010 | Takashima et al. ............. | 310/15 |
| 8,097,988 B2 * | 1/2012 | Kim et al. ....................... | 310/15 |
| 8,299,658 B2 | 10/2012 | Choi et al. | |
| 8,384,259 B2 | 2/2013 | Choi et al. | |
| 2009/0096299 A1 | 4/2009 | Ota et al. | |
| 2010/0327673 A1 * | 12/2010 | Jun et al. ......................... | 310/25 |
| 2011/0018367 A1 | 1/2011 | Kim et al. | |
| 2011/0068640 A1 * | 3/2011 | Choi et al. ....................... | 310/25 |

FOREIGN PATENT DOCUMENTS

| | | | | | |
|---|---|---|---|---|---|
| JP | 2002143770 A | * | 5/2002 | ............ | B06B 1/04 |
| JP | 2002153816 A | * | 5/2002 | ............ | B06B 1/04 |
| JP | 2003024871 A | * | 1/2003 | ............ | B06B 1/04 |
| JP | 2009-195895 A | | 9/2009 | | |
| KR | 10-0967033 B1 | | 6/2010 | | |
| KR | 10-2011-0009464 A | | 1/2011 | | |
| KR | 10-2011-0032890 A | | 3/2011 | | |

OTHER PUBLICATIONS

Machine Translation, JP 2002143770 A, Vibration Generator, May 21, 2002.*
Machine Translation, JP 2003024871 A, Vibrator, Jan. 28, 2003.*

(Continued)

*Primary Examiner* — Tran Nguyen
*Assistant Examiner* — Thomas Truong
(74) *Attorney, Agent, or Firm* — Saliwanchik, Lloyd & Eisenschenk (57) ABSTRACT

Disclosed is a linear vibrator, the linear vibrator including: a bottom case including a floor plate and first and second elastic units integrally formed with the floor plate, and mutually and oppositely bent from both distal ends facing the floor plate; a stator including a circuit substrate arranged on the floor plate and a coil block electrically connected to the circuit substrate; a trembler including a magnet discretely facing the coil block and a weight securing the magnet; and an upper case coupled to the bottom case to accommodate the stator and the trembler, wherein both lateral surfaces of the trembler facing the first and second elastic units are elastically supported by the first and second elastic units.

15 Claims, 6 Drawing Sheets

(56) References Cited

OTHER PUBLICATIONS

Machine Translation, JP 2002153816 A, May 28, 2002.*
Oxford English Dictionary, Definition of term "integral", Aug. 21, 2013.*
Office Action dated Jun. 12, 2012 in Korean Application No. 10-2010-0111729, filed Nov. 10, 2010.
Office Action dated Jun. 12, 2012 in Korean Application No. 10-2010-0111730, filed Nov. 10, 2010.
Office Action dated Dec. 27, 2012 in Korean Application No. 10-2010-0111730, filed Nov. 10, 2010.
Office Action dated Feb. 27, 2013 in Korean Application No. 10-2010-0111729, filed Nov. 10, 2010.

* cited by examiner

LINEAR VIBRATOR HAVING A TREMBLER WITH A MAGNET AND A WEIGHT

CROSS-REFERENCE TO RELATED APPLICATIONS

This application claims the benefit under 35 U.S.C. §119 of Korean Patent Application Nos. 10-2010-0111729, filed. Nov. 10, 2010, and 10-2010-0111730, filed Nov. 10, 2010, which are hereby incorporated by reference in their entirety.

BACKGROUND OF THE DISCLOSURE

1. Field of the Disclosure

The present disclosure relates to a linear vibrator.

2. Description of the Related Art

A linear vibrator is applied to various electronic devices, such as mobile phones, game players, mobile game players, game controllers and joy sticks, and electric tooth brushes, to generate vibration.

The linear vibrator generally includes a case including a bottom case and an upper case, a coil secured to the bottom case, a magnet arranged about or inside the coil, a weight securing the magnet, and a spring such as a leaf spring or a coil spring reciprocating the weight and the magnet from a upper case direction to a bottom case direction. The conventional linear vibrator is a vertical linear vibrator in which the magnet vertically reciprocates relative to the coil.

However, in the vertical linear vibrator that vertically reciprocates the magnet and the magnet inside the case to generate vibration, a space for vibrating the spring is needed because the spring is vertically driven to generate the vibration, whereby thickness and volume increase to disadvantageously increase thickness and volume of electronic products and living products in which the vertical linear vibrator is mounted.

BRIEF SUMMARY

The present disclosure is to provide a linear vibrator configured to reduce both thickness and superficial area by horizontally reciprocating a magnet and a weight inside a case to generate vibration, whereby vibration power can be increased to reduce an overall size of the vibrator.

Technical subjects to be solved by the present disclosure are not restricted to the above-mentioned description, and any other technical problems not mentioned so far will be clearly appreciated from the following description by those skilled in the art.

In one general broad aspect of the present disclosure, there is provided a linear vibrator, the linear vibrator comprising: a bottom case including a floor plate and first and second elastic units integrally formed with the floor plate, and mutually and oppositely bent from both distal ends facing the floor plate; a stator including a circuit substrate arranged on the floor plate and a coil block electrically connected to the circuit substrate; a trembler including a magnet discretely facing the coil block and a weight securing the magnet; and an upper case coupled to the bottom case to accommodate the stator and the trembler, wherein both lateral surfaces of the trembler facing the first and second elastic units are elastically supported by the first and second elastic units.

In another general broad aspect of the present disclosure, there is provided a linear vibrator, the vibrator comprising: a bottom case including a floor plate; a stator including a circuit substrate arranged on the floor plate and a coil block arranged on the circuit substrate; a trembler including a magnet discretely opposite to the coil block and a weight securing the magnet; and an upper case including an upper plate coupled to the bottom case and first and second elastic units integrally formed with the upper plate and mutually oppositely bent from both edges facing the upper plate, wherein both lateral surfaces of the trembler are respectively supported by the first and second elastic units integrally formed with the upper case.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification.

In the following description and/or claims, the terms "comprise" and "include," along with their derivatives, may be used and are intended as synonyms for each other. Furthermore, the terms "including", "includes", "having", "has", "with", or variants thereof are used in the detailed description and/or the claims to denote non-exhaustive inclusion in a manner similar to the term "comprising".

Words such as "thereafter," "then," "next," etc. are not intended to limit the order of the processes; these words are simply used to guide the reader through the description of the methods. The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. As may be used herein, the terms "substantially" and "approximately" provide an industry-accepted tolerance for its corresponding term and/or relativity between items.

First Exemplary Embodiment

Figure 1:
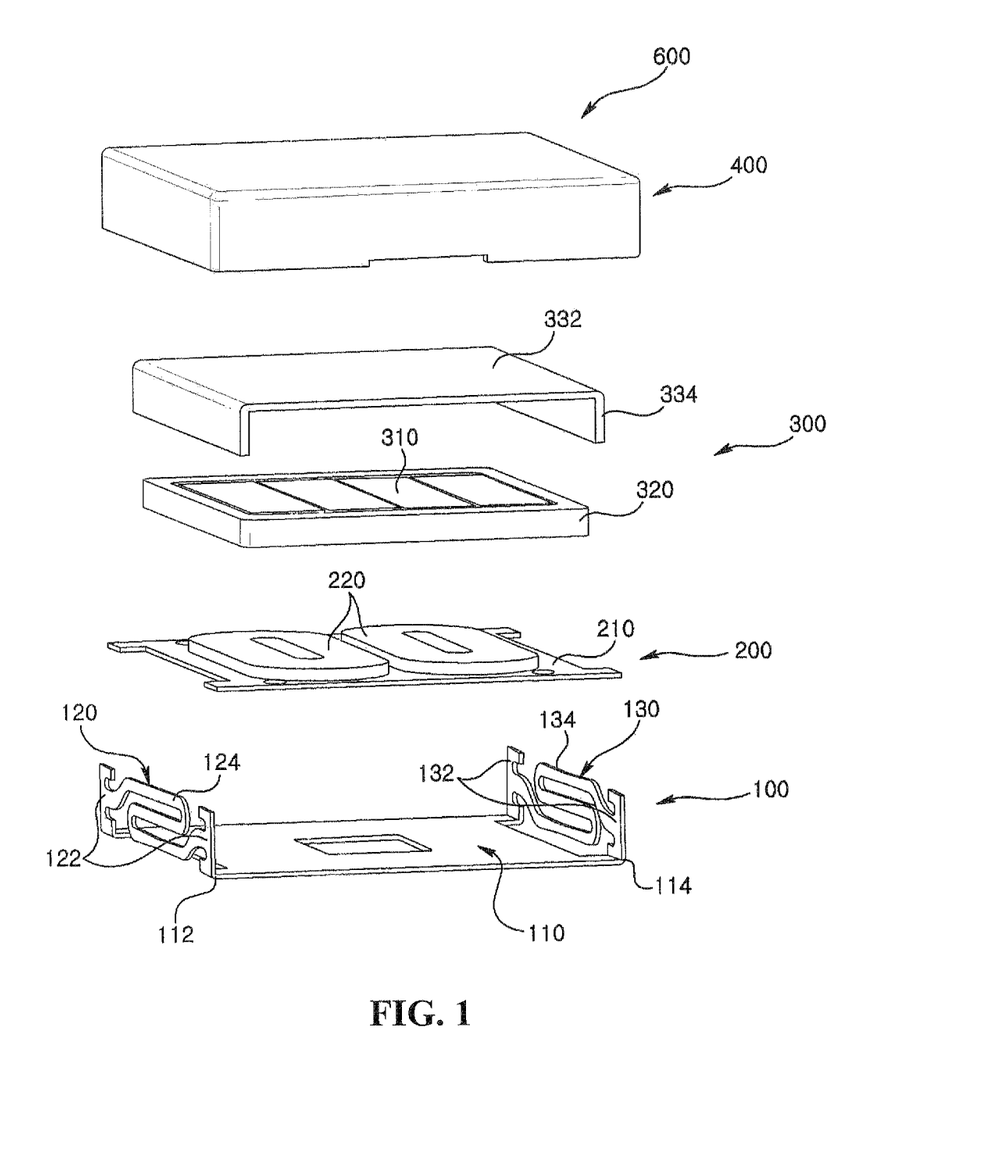
FIG. 1 is an exploded perspective view of a linear vibrator according to a first exemplary embodiment of the present disclosure.
Figure 2:
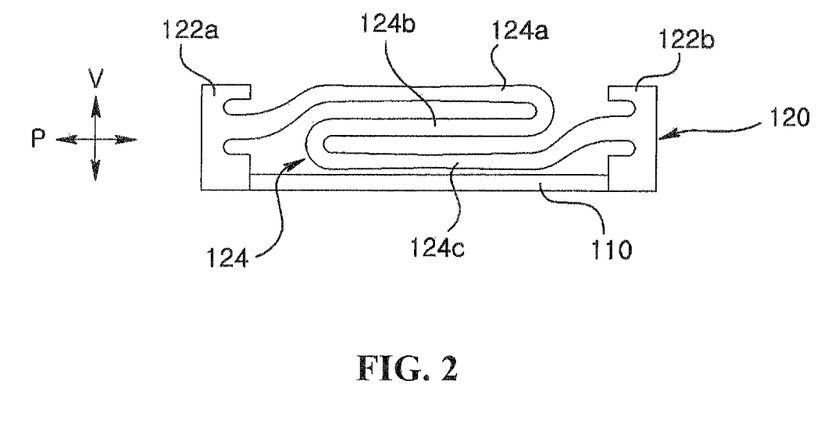
FIG. 2 is a front view of a first elastic unit of FIG. 1.
Figure 3:
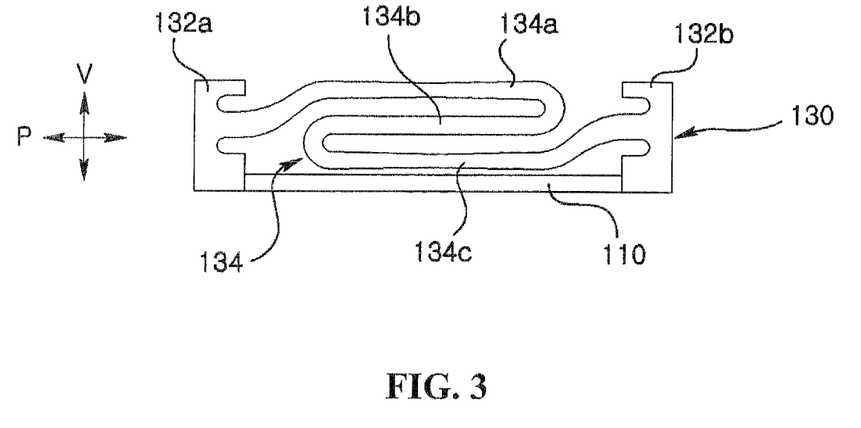
FIG. 3 is a front view of a second elastic unit of FIG. 1.
Figure 4:
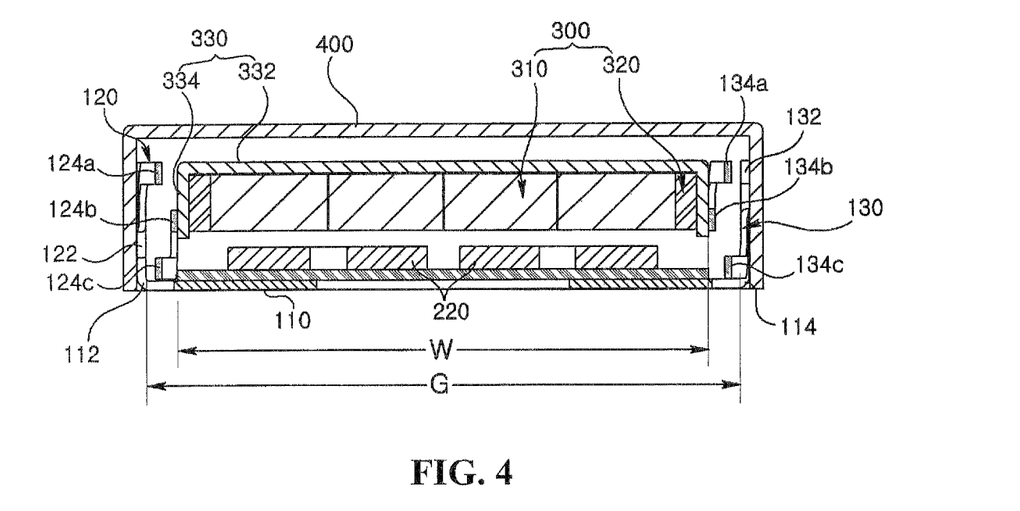
FIG. 4 is a schematic assembled cross-sectional view of a liner vibrator of FIG. 1.
Figure 5:
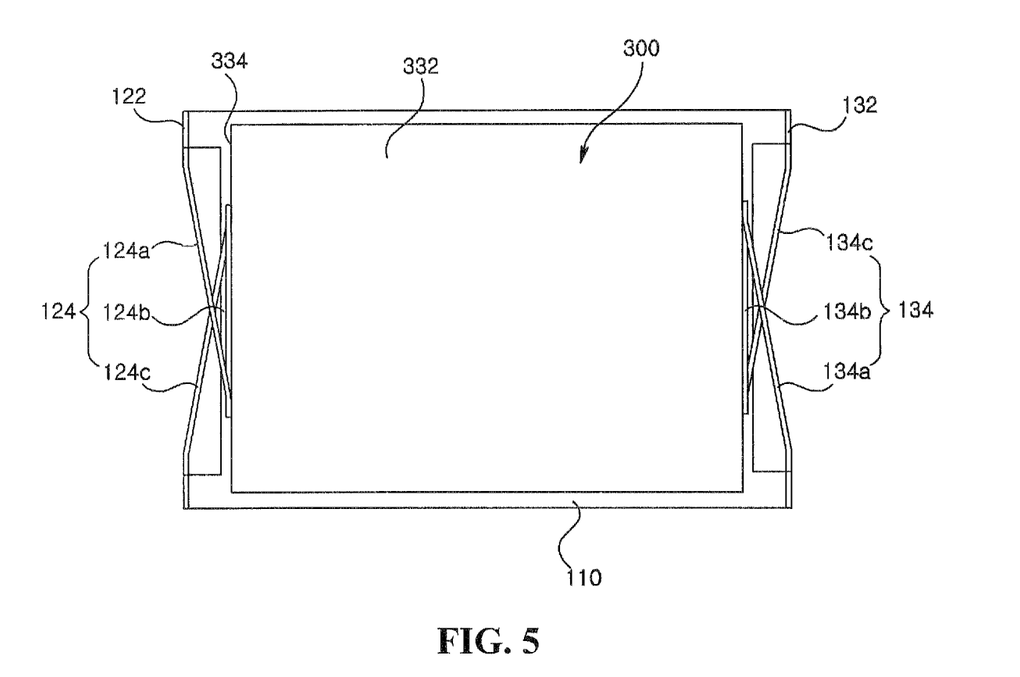
FIG. 5 is a plane view of a linear vibrator except for an upper case of FIG. 1.

FIG. 1 is an exploded perspective view of a linear vibrator according to a first exemplary embodiment of the present disclosure, FIG. 2 is a front view of a first elastic unit of FIG. 1, FIG. 3 is a front view of a second elastic unit of FIG. 1, FIG. 4 is a schematic assembled cross-sectional view of a liner vibrator of FIG. 1, and FIG. 5 is a plane view of a linear vibrator except for an upper case of FIG. 1.

Referring to FIGS. 1 to 5, a linear vibrator (600) includes a bottom case (100), a stator (200), a trembler (300) and an upper case (400).

The bottom case (100) may be formed by processing a metal plate, for example. The bottom case (100) includes a floor plate (110), a first elastic unit (120) and a second elastic unit (130). In the embodiment of the present disclosure, the floor plate (110), the first elastic unit (120) and the second elastic unit (130) may be integrally formed.

The floor plate (110) is formed in the shape of a plate. In the embodiment of the present disclosure, the floor plate (110) may take the shape of a rectangle, and be centrally formed with an opening. Both edges opposite to the floor plate (110) are defined as a first edge (112) and a second edge (114). A portion that is interfered or expected to be interfered by the first and second elastic units (120, 130, described later) on the floor plate (110) adjacent to the first and second edges (112, 114) is removed from the floor plate to form an opening.

The first elastic unit (120) is bent from the first edge of the floor plate (110), and the first elastic unit (120) and the floor plate (110) are substantially arranged in a vertical method. The first elastic unit (120) includes a first leaf spring unit (124) arranged between a pair of first fixtures (122a, 122b: 122) and a pair of first fixtures (122a, 122b).

Each of the first fixtures (122a, 122b) serve to fix the first leaf spring unit (124), and takes the shape of a post at both sides of the first edge (112) of the floor plate (110).

The first leaf spring unit (124) includes a first spring unit (124a), a second spring unit (124b) and a third spring unit (124c). Each of the first spring unit (124a), the second spring unit (124b) and the third spring unit (124c) is arranged along a vertical direction (V) relative to a direction (P) parallel to an upper surface of the floor plate (110), and discrete in parallel from the other at a same predetermined space.

A distal end of the first spring unit (124a) is connected to one (122a) of the first fixtures (122a, 122b), and a distal end of the third spring unit (124c) is connected to the other first fixture (122b) of the first fixtures (122a, 122b).

The other distal end opposite to the distal end of the first spring unit (124a) is curvedly connected to a distal end of the second spring unit (124b), and the other distal end opposite to the distal end of the third spring unit (124c) is curvedly connected to the other distal end opposite to the distal end of the second spring unit (124b).

That is, in the first embodiment of the present disclosure, the first, second and third spring units (124a, 124b, 124c) are zigzagged, the first fixtures (122a, 122b) and the first, second and third spring units (124a, 124b, 124c) are integrally formed.

In an alternative description, the first spring unit (124a) connected to any one of the first fixtures (122a) is connected to the second spring unit (124b) by turning 180 degrees, the second spring unit (124b) is connected to the third spring unit (124c) by turning 180 degrees, and the third spring unit (124c) is connected to another first fixture (122b).

In the first embodiment of the present disclosure, the first, second and third spring units (124a, 124b, 124c) are zigzag formed in series, a distal end of the first spring unit (124a) is connected to any one of the first fixtures (122a), and the third spring unit (124c) is connected to any one remaining fixture (122b).

Referring to FIGS. 1 and 3, the second elastic unit (130) is bent from the second edge (114) of the floor plate (110), the second elastic unit (130) is substantially vertical to the floor plate (110), and the second elastic unit (130) is arranged opposite to the first elastic unit (120). The second elastic unit (130) includes second fixtures (132a, 132b: 132) and second leaf spring unit (134).

Each of the second fixtures (132a, 132b) serves to fix the second leaf spring unit (134) and is formed in the shape of a post at both sides of the second edge (114) of the floor plate (110). The second leaf spring unit (134) includes a fourth spring unit (134a), a fifth spring unit (134b) and a six spring unit (134c).

The fourth, fifth and sixth spring units (134a, 134b, 134c) are arranged to a vertical direction (V) relative to a direction (P) parallel to an upper surface of the floor plate (11.0) and discrete in parallel each at a same predetermined space.

A distal end of the fourth spring unit (134a) is connected to one (132a) of the second fixtures (132a, 132b), and a distal end of the sixth spring unit (134c) is connected to the other second fixture (132b) of the second fixtures (132a, 132b).

The other distal end opposite to the distal end of the fourth spring unit (134a) is curvedly connected to a distal end of the fifth spring unit (134b), and the other distal end opposite to the distal end of the sixth spring unit (134e) is curvedly connected to the other distal end opposite to the distal end of the fifth spring unit (134b).

That is, in the first embodiment of the present disclosure, the fourth, fifth and sixth spring units (134a, 134b, 134c) are zigzag arranged, the second fixtures (132a, 132b) and the fourth, fifth and sixth spring units (134a, 134b, 134c) are integrally formed.

In an alternative description, the fourth spring unit (134a) connected to any one of the second fixtures (132a) is connected to the fifth spring unit (134b) by turning 180 degrees, the fifth spring unit (134b) is connected to the sixth spring unit (134c) by turning 180 degrees, and the sixth spring unit (134c) is connected to another remaining second fixture (132b).

In the first embodiment of the present disclosure, the fourth, fifth and sixth spring units (134a, 134b, 134c) are zigzag shaped formed is series, a distal end of the fourth spring unit (134a) is connected to any one of the second fixtures (132a), and the sixth spring unit (134c) is connected to any one remaining fixture (132b).

In the first embodiment of the present disclosure, the floor plate (110) of the bottom case (100) and the first and second elastic units (120, 130) may be formed at one time by punching a metal plate and a pressing process capable of bending the metal plate.

The stator (200) is arranged on an upper surface of the floor plate (110) of the bottom case (100), and includes a circuit substrate (210) and a coil block (220).

The circuit substrate (210) is arranged on the upper surface of the floor plate (110), and a bottom surface of the circuit substrate (210) corresponding to an opening formed at the floor plate (110) may be arranged with a connection terminal electrically connected to an outside circuit substrate.

The coil block (220) is arranged on an upper surface opposite to the bottom surface of the circuit substrate (210), and one or two coil blocks (220) may be preferably arranged on the upper surface of the circuit substrate (210). Each of the coil blocks (220) is electrically connected to a circuit substrate (210).

The coil block (210) is formed by winding an insulated wire using an insulation resin, and formed therein with a rectangle-shaped long narrow width of opening.

The trembler includes a magnet (310) and a weight (320). The trembler may further include a yoke (330).

The magnet (310) is arranged on the upper surface of the coil blocks (220). The magnet (310) is magnetically formed with alternatively different polarities for generating an attractive force and a repulsive force by a magnetic flux generated by the coil blocks (220). In a case two coil blocks (220) are arranged on the upper surface of the circuit substrate (210), the magnet (310) is alternatively formed with four poles of a N pole-S pole-N pole-S pole shape.

The weight (320) serves to improve vibrating force of the trembler (300) and to fix the magnet (310). The weight (320) takes the shape of a frame having an opening for fixing the magnet (310).

The yoke (330) includes mutually opposite lateral plates (334) each extended to a same direction from an upper plate (332) and both edges opposite to the upper plate (332). The mutually opposite pair of lateral plates (334) respectively faces the first and second elastic units (120, 130) integrally formed with the bottom case (100). The yoke (330) functions to inhibit the magnetic flux generated from the magnet from leaking to further enhance a vibration characteristic of the trembler (300).

In the first embodiment of the present disclosure, the first and second elastic units (120, 130) integrally formed with the bottom case (100) is coupled to the trembler (300).

In order to vibrate the trembler (300), the first and second elastic units (120, 130) are discrete each at a predetermined space (G) as shown in FIG. 4, and the trembler (300) is formed with a width (W) narrower than the discrete space (G) between the first and second elastic units (120, 130).

In the first embodiment of the present disclosure, in a case the trembler (300) does not include the yoke (330), the weight (320) of the trembler (300) is coupled to the first and second elastic units (120, 130). Meanwhile, in a case the trembler (300) includes the yoke (330), the first and second elastic units (120, 130) are coupled to the lateral plate (334) of the yoke (330).

In the first embodiment of the present disclosure, the trembler (300) and the first and second elastic units (120, 130) may be mutually coupled by a welding method such as spot welding method. The second spring unit (124b) among the first, second and third spring units (124a, 124b, 124c) constituting the first elastic unit (120) may be welded to any one lateral plates (334) of the yoke (330) at the trembler (300).

Furthermore, the fifth spring unit (134b) in the fourth, fifth and sixth spring units (134a, 134b, 134c) constituting the second elastic unit (130) may be welded to remaining one lateral plates (334) of the yoke (330) at the trembler (300).

In the first embodiment of the present disclosure, due to the fact that the space between the first and second elastic units (120, 130) is smaller than the width of the yoke at the trembler (300), the second spring unit (124b) of the first elastic unit (120) is brought into close contact with the lateral plate (334) of the yoke (330), where the first and third spring units (124a, 124c) are distanced from the lateral plate (334) of the yoke (330).

Furthermore, due to the fact that the space between the first and second elastic units (120, 130) is smaller than the width of the yoke at the trembler (300), the fifth spring unit (134b) of the second elastic unit (130) is brought into close contact with the lateral plate (334) of the yoke (330), where the fourth and sixth spring units (134a, 134c) are distanced from the lateral plate (334) of the yoke (330).

The upper case (400) takes the shape of a bottom-opened cylinder, and is coupled to the bottom case (100), where an accommodation space formed by the upper case (400) and the bottom case (100) is accommodated by the stator (200) and the trembler (300).

Figure 6:
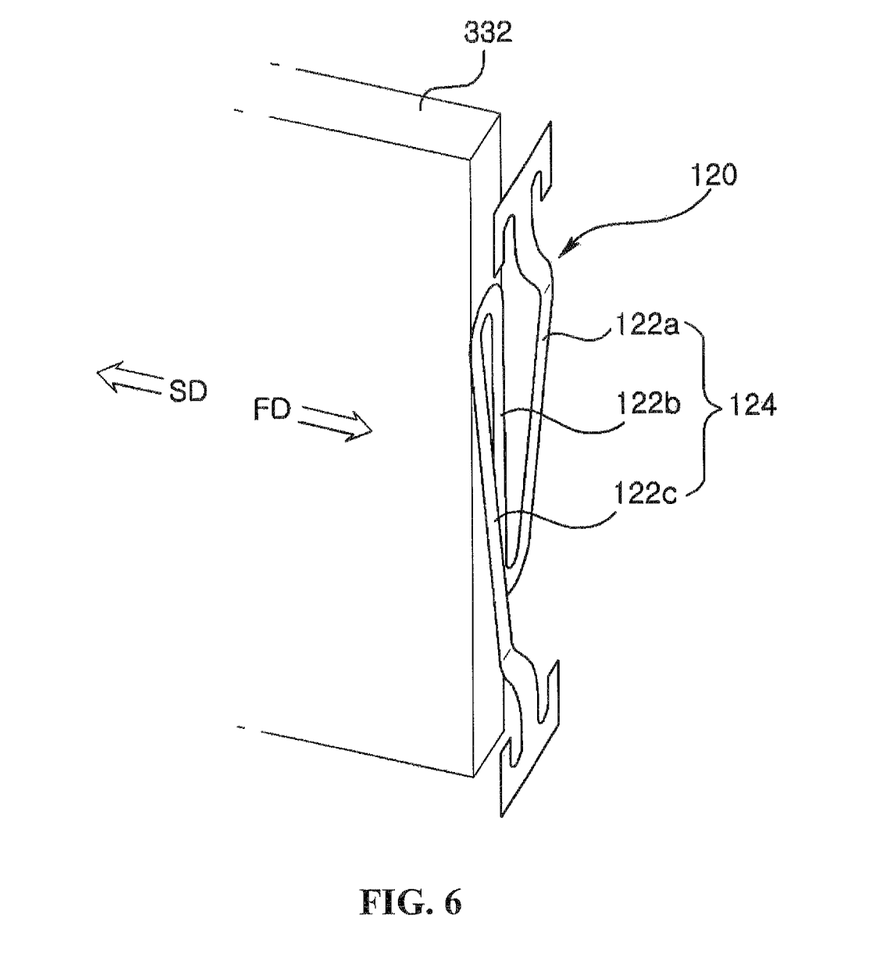
FIGS. 6 and 7 are perspective views illustrating a trembling process of a trembler by a first elastic unit according to a first exemplary embodiment of the present disclosure.
Figure 7:
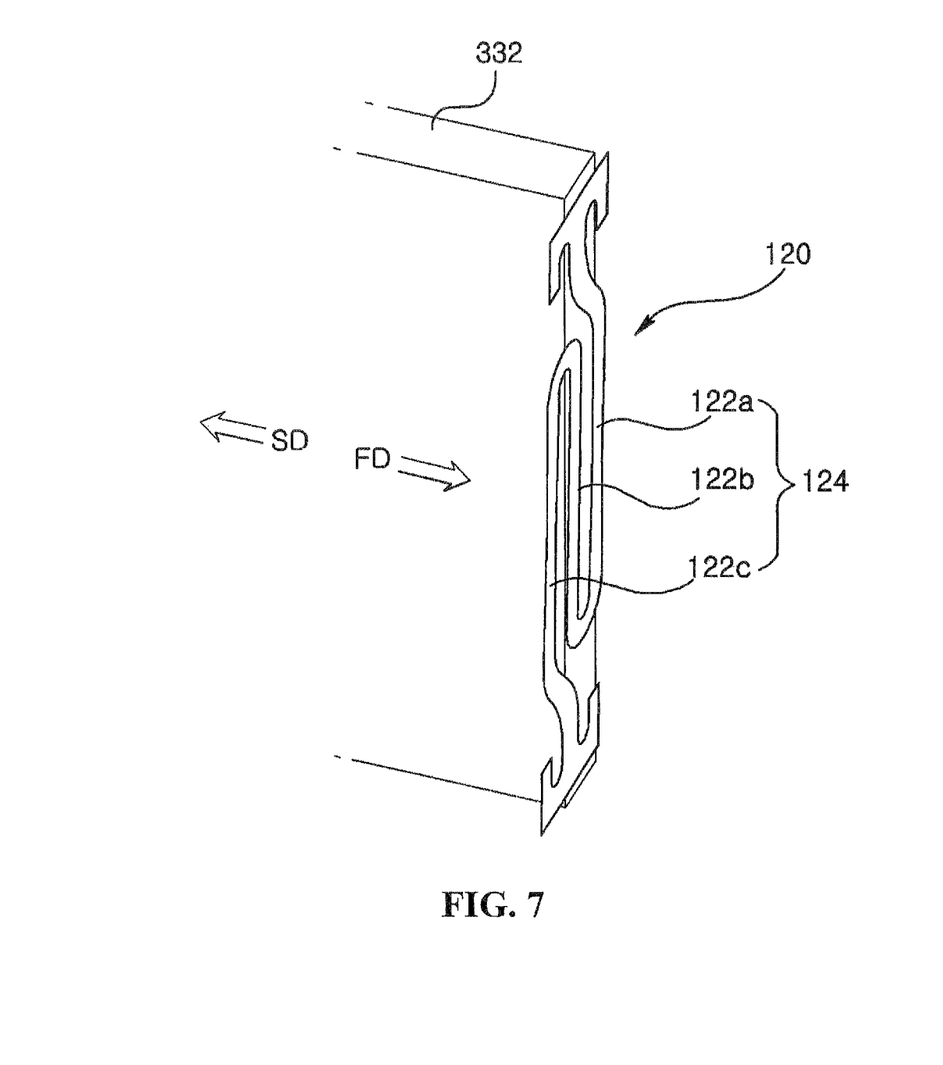

FIGS. 6 and 7 are perspective views illustrating a trembling process of a trembler by a first elastic unit according to a first exemplary embodiment of the present disclosure.

Referring to FIGS. 1 and 6, in a case the coil block (220) is applied with a current to generate a magnetic field from the coil block (220), the trembler (300) is applied with an attractive force and a repulsive force generated by a magnetic field generated by the coil block (220) and a magnetic field generated by the magnet (310), and the trembler (300) moves to a first direction (FD) facing the first elastic unit (120) by the attractive and repulsive forces.

The second spring unit (122b) of the first elastic unit (120) receives a compression force in response to movement of the trembler (300), and the trembler (300) receives a maximum compression force when the trembler (300) maximally moves to the first direction (FD), as shown in FIG. 7. All the first, second and third spring units (122a, 122b, 122c) of the first elastic unit (120) are substantially aligned on a same planar surface when the trembler (300) is maximally moved to the first direction (FD).

Thereafter, in a case the coil block (200) is interrupted with a current or the coil block (200) is applied with a reverse current, a force for moving the trembler (300) to the first direction (FD) is removed, whereby the trembler (300) is moved to a second direction (SD), which is a reverse direction of the first direction (FD), by the compression force of the first elastic unit (120). These processes are repeated to allow the trembler (300) to horizontally move on the coil block (200).

Second Exemplary Embodiment

Figure 8:
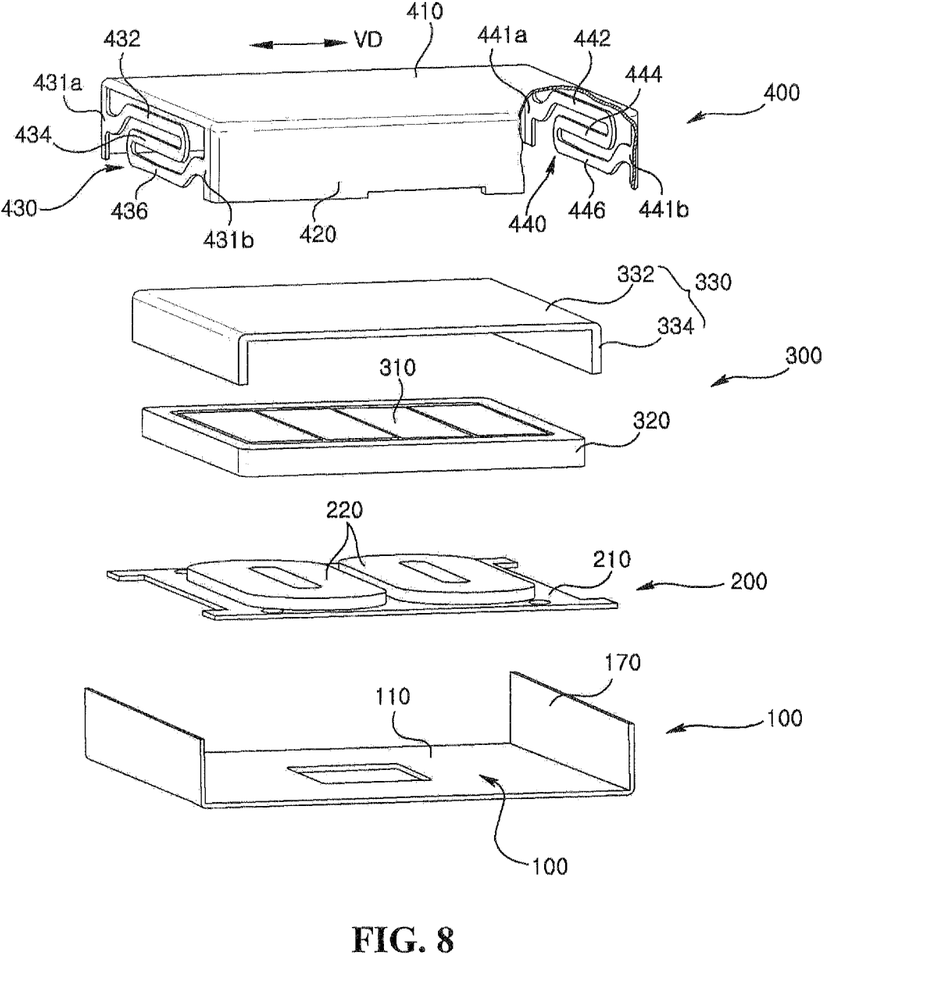
FIG. 8 is a cross-sectional view illustrating a linear vibrator according to a second exemplary embodiment of the present disclosure.

FIG. 8 is a cross-sectional view illustrating a linear vibrator according to a second exemplary embodiment of the present disclosure.

A linear vibrator illustrated in FIG. 8 is substantially same as that of the linear vibrator illustrated in FIGS. 1 to 7 except for positions of the first and second elastic units. Thus, redundant description as that of FIGS. 1 to 7 will be omitted, and if considered appropriate, reference numerals have been repeated among the figures to indicate corresponding and/or analogous elements.

Referring to FIG. 8, a linear vibrator (600) includes a bottom case (100), a stator (200), a trembler (300) and an upper case (400) including first and second elastic units (430, 440).

The upper case (400) includes an upper plate (410), a lateral surface plate (420), and first and second elastic units (430, 440).

In a non-limiting example, the upper plate (410) takes the shape of a rectangular plate, and the lateral surface plate (420) is extended to the bottom case (100) from both edges of the upper plate (410) parallel with a vibration direction (VD) of the trembler (300), and coupled to the bottom case (100).

The first and second elastic units (430, 440) are perpendicularly formed on the upper plate (410) relative to each lateral surface plate (420), where the first elastic unit (430) faces the second elastic unit (440).

The first elastic unit (430) includes a first spring unit (432), a second spring unit (434) connected to the first spring unit (432), and a third spring unit (436) connected to the second spring unit (434), where the first, second and third spring units (432, 434, 436) are arranged in parallel.

The first spring unit (432) is integrally formed with any one of first fixtures (431a) integrally formed with the upper plate (410), and the third spring unit (436) is integrally formed with a remaining first fixture (431b) integrally formed with the upper plate (410). The second spring unit (434) is secured to a lateral surface of the trembler (300) by way of welding.

The second (430) includes a fourth spring unit (442), a fifth spring unit (444) connected to the fourth spring unit (442), and a sixth spring unit (446) connected to the fourth spring unit (442), where the fourth, fifth and sixth units (442, 444, 446) are arranged in parallel.

The fourth spring unit (442) is integrally formed with any one of second fixtures (441a) integrally formed with the upper plate (410), and the sixth spring unit (446) is integrally formed with a remaining second fixture (441b) integrally formed with the upper plate (410). The fifth spring unit (444) is secured to the other lateral surface opposite to the one lateral surface of the trembler (300) by way of welding.

Meanwhile, in a case the first and second elastic units (430, 440) are exposed to the upper case (400), there is a risk of the first and second elastic units (430, 440) being damaged, such that the bottom case (100) may be formed with a protective plate (170) covering the first and second elastic units (430, 440) of the upper case (400).

As apparent from the foregoing, the linear vibrator according to the exemplary embodiments of the present disclosure has an industrial applicability in that first and second elastic units are bent from a bottom case or an upper case, and first and second elastic units are respectively coupled to both lateral sides of a trembler to allow the trembler of the linear vibrator to vibrate to a horizontal direction relative to a coil block, whereby thickness of the linear vibrator is reduced, and a superficial area of the linear vibrator is also reduced by the first and second elastic units to effectively manufacture the linear vibrator in a further compact style.

The above-mentioned linear vibrator according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A linear vibrator, comprising:
a bottom case including a floor plate;
a stator including a circuit substrate arranged on the floor plate and a coil block disposed on the circuit substrate and electrically connected to the circuit substrate;
a trembler including a magnet facing the coil block and a weight coupled to the magnet;
an upper case coupled to the bottom case to accommodate the stator and the trembler; and
first and second elastic units extended from the floor plate of the bottom case respectively, the first and second elastic units being arranged perpendicular to the floor plate;
wherein the trembler is coupled to the first and the second elastic units respectively;
wherein each of the first and second elastic units includes fixtures extended from the floor plate of the bottom case, and a zigzagged leaf spring unit connected at both distal ends to each fixture;
wherein the leaf spring unit includes a plurality of spring units mutually and vertically arranged in parallel relative to the floor plate, each connected in series; and
wherein a center spring unit in the plurality of spring units is coupled to a lateral surface of the trembler.

2. The linear vibrator of claim 1, wherein the trembler further includes a yoke that covers an upper surface of the weight and both lateral surfaces of the weight facing the first and second elastic units.

3. The linear vibrator of claim 2, wherein both lateral surfaces of the yoke are respectively welded to the first and second elastic units.

4. The linear vibrator of claim 1, wherein both lateral surfaces of the trembler are respectively coupled to the first and second elastic units.

5. The linear vibrator of claim 1, wherein width of the trembler is smaller than a gap between the mutually facing the first and second elastic units.

6. The linear vibrator of claim 1, wherein the center spring unit in the plurality of spring units is welded to a lateral surface of the trembler.

7. The linear vibrator of claim 1, wherein at least one coil block is provided.

8. A linear vibrator, comprising:
a bottom case including a floor plate;
a stator including a circuit substrate arranged on the floor plate and a coil block arranged on the circuit substrate;
a trembler including a magnet opposite to the coil block and a weight coupled to the magnet;
an upper case including an upper plate coupled to the bottom case; and
first and second elastic units extended from the upper plate of the upper case respectively, the first and second elastic units being arranged perpendicular to the upper plate;
wherein the trembler is coupled to the first and the second elastic units respectively;
wherein each of the first and second elastic units includes fixtures extended from the upper plate, and a zigzagged leaf spring unit connected at both distal ends to each fixture;
wherein the leaf spring unit includes a plurality of spring units mutually and vertically arranged in parallel relative to the upper plate, each connected in series; and
wherein a center spring unit in the plurality of spring units is coupled to a lateral surface of the trembler.

9. The linear vibrator of claim 8, wherein the trembler further includes a yoke that covers an upper surface of the weight and both lateral surfaces of the weight facing the first and second elastic units.

10. The linear vibrator of claim 9, wherein both lateral surfaces of the yoke are respectively welded to the first and second elastic units.

11. The linear vibrator of claim 8, wherein both lateral surfaces of the trembler are respectively coupled to the first and second elastic units.

12. The linear vibrator of claim 8, wherein width of the trembler is smaller than a gap between the mutually facing the first and second elastic units.

13. The linear vibrator of claim 8, wherein at least one coil block is provided.

14. The linear vibrator of claim 8, wherein the bottom case includes a protective plate bent from the bottom case to cover the first and second elastic units.

15. The linear vibrator of claim 8, wherein the center spring unit in the plurality of spring units is welded to each lateral surface of the trembler.

\* \* \* \* \*